United States Patent Office 3,360,484
Patented Dec. 26, 1967

3,360,484
HYDROCARBON CONVERSION CATALYST AND
PREPARATION THEREOF
Sebastian Marc Laurent, Baton Rouge, La., assignor to
Esso Research and Engineering Company, a corporation
of Delaware
No Drawing. Filed Aug. 24, 1965, Ser. No. 482,265
8 Claims. (Cl. 252—455)

This invention is concerned with improvements in the preparation of catalysts for hydrocarbon conversion processes. More particularly, the present invention relates to improvements in the manufacture of catalysts for petroleum hydrocracking processes wherein the catalysts comprises a platinum group metal, e.g., palladium, associated with a crystalline aluminosilicate zeolite base. Specifically, the invention is concerned with improved methods for impregnating or base exchanging zeolite base material with acidic solutions of palladium.

The hydrocracking process, i.e., the cracking of hydrocarbons in the presence of hydrogen, is a well-known petroleum refining operation. Hydrocracking is most generally applied to the cracking of hydrocarbons in the range of heavy naphtha and gas oil, although it may be employed also far upgrading heavy gas oils and even higher boiling feedstocks by converting them to lower boiling gas oil fractions or to gasoline. The hydrocracking process may be applied to virgin naphtha, catalytic naphthas, gas oils, cycle oils and fractions obtained from conventional petroleum cracking operations, that boil generally in the gas oil range. The process is also of interest in converting alkylated aromatic fractions to lower-boiling alkyl aromatic hydrocarbons as well as to totally dealkylated aromatics.

While a number of catalysts have been suggested in the prior art for use in hydrocracking processes, many of these catalysts have not been completely satisfactory for a number of reasons. Some of them are sensitive to the presence of feed impurities, particularly organic nitrogen. Such catalysts, which include the metals, oxides and sulfides of iron group metals, require frequent regeneration or, alternatively, maintenance of reaction conditions that are not conductive to high yields of desired products. Other catalysts, as for example noble metals supported on conventional amorphous cracking catalysts such as silica-alumina, silica-magnesia, silica-alumina-magnesia and the like, have not shown as high an activity as is desirable and also require regeneration more frequently than is desired.

It has been recently found that, particularly for fixed bed hydrocracning operations, a highly effective catalyst comprises a platinum group metal, or a compound of a platinum group metal, deposited on, composited with or incorporated within a molecular sieve zeolite of 6 to 15 A. pore size which has been cationically exchanged to remove at least a major proportion, if not all, of its sodium content. Platinum group metals include platinum, palladium, rhodium, osmium, iridium and the like.

Crystalline alumino-silicate zeolites that have molecular sieve properties are now well known in the art. While the molecular sieve zeolites differ from each other in chemical compositions, they may be generally characterized as alkali metal or alkaline earth metal, hydrated alumino-silicates. Their crystal patterns are such that they present structures containing a large number of pores having an exceptional uniformity of size. The pores in different zeolites may vary in diameter from less than 4 A. to 15 A. or more; but for any one of these zeolites, the pores are essentially of uniform size. Because of this, such zeolites are popularly known as molecular sieves.

Molecular sieve zeolites that have pore openings in the range of from about 6 to 15 A. can be employed as catalysts or catalyst bases for various processes, particularly hydrocarbon conversion processes, because the pore sizes are such that they allow for easy ingress of substantially all hydrocarbon feed types and egress of the reaction products. This minimizes catalytic coke build-up within the structure of the catalyst and enables the catalyst to be more easily regenerated.

The prior art method for compositing or impregnating a platinum group such as palladium onto a catalyst support material such as the zeolite molecular sieve is by treating (e.g., wet impregnation or base-exchange) the support material with a palladium salt or ammonium complex in a basic medium. For example, the art teaches that a suitable palladium catalyst may be prepared by simply slurrying the desired quantity of a base exchanged zeolite in water, subsequently adding an ammoniacal palladium solution containing the desired quantity of palladium, and mixing the resulting slurry for a short period of time at ambient temperature. The catalyst is then preferably subjected to calcination at elevated temperatures, e.g., about 500°–1500° F.

It has now been found that hydrocarbon conversion catalysts comprising palladium composited on molecular sieve zeolites exhibiting substantially increased activity may be prepared by utilizing an acidic solution of a soluble palladium compound, e.g., a salt, as the impregnating or exchange medium. Furthermore, it has unexpectedly been found that use of such acidic medium to incorporate palladium onto a zeolite molecular sieve does not adversely affect the stability of the treated sieve.

Suitable palladium compounds for use in the impregnation or exchange medium include the following: $PdCl_2$, $PdCl_2 \cdot HCl$, $PdCl_2 \cdot 2H_2O$, $PdF_2$, $PdSo_4 \cdot 2H_2O$, $PdI_2$, and $Pd(No_3)_2$. (Note: Some of these salts have low solubility in water alone, but water with small amounts of added acid such as HCl, $HNO_3$, HBr, etc., dissolves the salts readily thus making acidic impregnation solutions easily obtainable with any of the above listed compounds.) A particularly desirable palladium compound is palladium chloride.

The impregnation or exchange medium of the present invention is prepared by dissolving a palladium compound, e.g., palladium chloride, in a dilute aqueous solution containing an acid of sufficient strength to form the salt of the palladium compound. Particularly suitable acids for use in forming such salts are the mineral acids, e.g., HCl, $HNO_3$, HBr, $H_2So_4$, etc. A preferred mineral acid is HCl. However, other acids such as acetic, phosphoric, perchloric, etc., can also be utilized in the practice of the present invention.

The concentration of the palladium compound is selected so as to yield 0.1 to 5.0 wt. percent, preferably 0.2 to 1.0 wt. percent of palladium on the zeolite sieve. This generally would mean that the dilute aqueous acidic solution of the palladium compound should contain between about 0.0001 to 0.005 gram of palladium, per cc. of solution, preferably 0.0002 to 0.001 gram of palladium per cc. of solution when a dilution of 10 cc. of solution per gram of zeolite is employed.

It is also possible to utilize the acid salt of the palladium compound directly in the dilute aqueous solution, thereby obviating the need of forming the acid salt in situ. A very preferred example of this embodiment is $$PdCl_2 \cdot HCl$$

added directly to the aqueous solution.

In accordance with the present invention, hydrocracking is accomplished in the presence of hydrogen and the palladium containing catalyst as prepared above at temperatures of from about 550°–850° F., preferably 675°–775° F.; pressures of from about 500 to about 3,000 p.s.i.g., preferably 1,500 to 2,000 p.s.i.g.; liquid hourly space velocities of from about 0.1 to about 10, preferably 0.5 to 2.5, volumes of feed per volume of catalyst per hour; and hydrogen rates of from about 2,000 to about 20,000, preferably 6,000 to 12,000, standard cubic feet (s.c.f.) per barrel of feed. The conversion, expressed as volume percent conversion to products boiling below about 430° F., will generally be maintained at about 30 to 80%, preferably 50 to 60%, although other levels may be readily employed. A fixed, moving, or fluidized bed reactor may be employed.

The hydrocarbon oil feeds contemplated for use in the process of the present invention include total crude oils, topped crude oils, vis broken petroleum residua, shale oil, coal tar, etc. Such feeds are characterized by their relatively high total nitrogen contents, their high boiling constituents and particularly by the high nitrogen contents of the high boiling fractions contained therein. Specifically, these hydrocarbon oil feeds contain between about 100 and about 20,000 p.p.m. total nitrogen; and at least about 20 vol. percent, e.g., 20 to 100 vol. percent of a petroleum fraction having an initial boiling point at least about 650° F., preferably at least about 800° F., said fraction containing at least about 500 p.p.m., preferably 600 to 5,000 p.p.m., nitrogen. Among the feeds most preferably utilized are total or reduced crudes (atmospheric residua) containing about 2 to 40 vol. percent of a petroleum fraction boiling above about 1,000° F., said fraction containing at least about 2,000 p.p.m. nitrogen. These heavy oils may also be characterized by their specific gravities, sulfur contents, Conradson carbon residues, etc. However, because of the wide variance of these properties in the hydrocarbon feeds contemplated, it will be most meaningful to utilize the foregoing description, as the nitrogen content and the boiling range (or molecular weight) of the nitrogen-containing fractions are determinative factors in their susceptibility to hydrocracking. By way of illustration, typical heavy hydrocarbon oils may have specific gravities of about 1 to 40° APPI, sulfur contents of 0.1 to 5 wt. percent and Conradson carbon residues of 0.5 to 20 wt. percent.

It is also possible to utilize feed stocks having boiling points well below the heavy feeds described above. For example, catalytic cycle stocks boiling essentially totally below about 650° F. and having a nitrogen content of up to 1700 p.p.m. may also be employed.

The hydrocracking catalyst utilized for the conversion of the aforementioned hydrocarbon oil feeds comprises a crystalline metallic alumino-silicate zeolite, well known in the art as a "molecular sieve," having a platinum group metal (e.g., palladium) deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline alumino-silicate zeolites, having effective pore diameters of about 6 to 15, preferably 8 to 15 A. units, when composited with the platinum group metal, and particularly after base exchange to reduce the alkali metal oxide (e.g., $Na_2O$) content of the zeolite to less than about 10 wt. percent, are effective hydrocracking catalysts, particularly for the hydrocarbon oil feeds herein contemplated. The size of the pore openings is regarded as critical since smaller openings e.g., 4 A., will not be large enough to allow entry of certain heavy hydrocarbon molecules such as branched chain paraffins, cyclic compounds, etc. Additionally, the crystalline nature of the catalyst is important, since it determines the uniformity of the pore openings.

Naturally-occurring large pore crystalline alumino-silicate zeolites may be exemplified by the mineral faujasite which may be beneficially employed. Synthetically produced alumino-silicate zeolites having large pore diameters, such as synthetic faujasite and synthetic mordenite, are also available and will be preferred in the present invention. In general, all crystalline alumino-silicate zeolites, in natural or synthetic form, contain a substantial portion of an alkali metal oxide, normally sodium oxide.

More specifically, the support for the hydrocracking catalysts used in the present invention is a crystalline alumino-silicate zeolite having an effective pore diameter of about 6 to 15 A., preferably 8 to 15 A., wherein a substantial portion of the alkali metal, e.g., sodium, has been replaced with a cation (either a metal cation or a hydrogen-containing cation, e.g., $NH_4+$) so as to reduce the alkali metal oxide (e.g., $Na_2O$) content to less than 10 wt. percent and preferably to about 1 to 5 wt. percent (based on zeolite). The anhydrous form of the base-exchangeed large port crystalline alumino-silicate zeolite prior to compositing with palladium may be generally expressed in terms of moles by the formula:

$$0.9 \pm 0.2 Me2/nO : Al_2O_3 : XSiO_2$$

wherein Me is selected from the group consisting of hydrogen and metal cations (so that the alkali metal oxide content is less than 10 wt. percent of the zeolite), $n$ is its valence and X is a number from 2.5 to 14, preferably 3 to 10 and most preferably 4 to 6. Crystalline zeolites having these silica to alumina ratios have been found to be highly active, selective and stable.

Molecular sieve zeolites having pore openings in the range of from about 6 A. to about 15 A. and varying silica-to-alumina ratios may be prepared by any of the methods known in the art. The principle involved is to have present the proper amount and ratios of silica, alumina and sodium hydroxide. Alumina may be supplied in the form of sodium aluminate or an alumina sol or the like, silica may be supplied in the form of sodium silicate and/or silica gel and/or a silica sol, and alkali may be furnished by an alkaline hydroxide, as for example sodium hydroxide, either as such or in combination with sodium aluminate and/or sodium silicate. As taught in the prior art, careful control should be kept over the pH, the sodium ion concentration of the mix, and the crystallization period. Suitable processes for preparing molecular sieves in this manner are described, for example, in U.S. Patents 2,882,244 and 2,971,904.

Other catalysts or catalyst supports can be prepared by replacing the sodium in the original molecular sieve by other elements such as cobalt, nickel, zinc, magnesium, calcium, cadmium, copper and barium. This is accomplished by reacting the crystalline molecular sieve in solution with a salt such as magnesium sulfate, calcium chloride, barium chloride, cobalt chloride, etc. Such base-exchanged sieves may be employed as catalysts per se or as in the practice of the present invention, they may be used as supports for another catalyst such as palladium.

As a finishing step in the preparation of a molecular sieve, either in its original form or in the form of a base-exchanged material or in the form of a molecular sieve that has been impregnated with an additional catalytic material, such as palladium, the sieve or sieve catalyst is subjected to a calcining operation which may involve heating the material at a temperature of from 400° F. to about 1000° F. for several hours. For example, it may involve 2 hours heating at 400° F. followed by 4 hours at 550° F. followed by a 16-hour treat at 850° F.

The invention will be further illustrated by reference to the following examples, which are not intended to be limiting.

*Example 1*

Two catalyst samples were prepared utilizing the identical hydrogen form synthetic faujasite base. Sample 1 was loaded with 0.5 wt. percent palladium in the conventional manner using ammoniacal palladium chloride solution, as follows:

A slurry is made of 200 grams of the synthetic faujasite base in 700 ml. of deionized water. To this slurry is slowly added while stirring a solution that has been made as follows: dilute 24 ml. of 28% ammonium hydroxide to 90 cc., heat to 130° F., add 120 ml. of palladium chloride solution containing 1.0 gram of palladium. After the solution has been added to the slurry and stirring continued for ten minutes the faujasite containing the palladium is filtered from the solution, washed three times with 500 ml. of deionized water and dried at 300° F. Sample 2 was treated with $PdCl_2 \cdot HCl$ in dilute aqueous solution to a level of 0.5 wt. percent palladium as follows:

A slurry is made of 200 grams of the same synthetic faujasite base used for sample 1 in 700 ml. of deionized water. To this slurry is slowly added while stirring 200 ml. of an acidic solution of $PdCl_2 \cdot HCl$ containing 0.05 gram of palladium per cc. Stirring is continued for 10 minutes, and then the faujasite containing palladium is filtered from the solution, washed three times with 500 ml. of deionized water and dried at 300° F. The two catalysts were tested in a microtesting pilot unit with a normal heptane feed. The resulting test data is summarized below in Table I:

TABLE I.—700° F., 3 MINUTE CYCLE TIME, ATMOSPHERIC PRESSURE

|  | Feed Rate, w./hr./W. | Conversion Wt. Percent of Product Boiling Below 430° F. |
| --- | --- | --- |
| Sample 1 | 21.16 | 21.9 |
| Sample 2 | 23.65 | 31.8 |

The data contained in Table I clearly indicates that at the same nominal feed rate the catalyst prepared by the method of the present invention, i.e., sample 2, gives 1½ times the conversion of a catalyst prepared by the conventional method.

*Example 2*

A 200 gram aliquot of the synthetic faujasite base of Example 1 was slurried in 700 ml. of deionized water. To this stirring slurry was slowly added 400 ml. of a solution formed by dissolving 2.2 grams of palladium nitrate in dilute nitric acid, such solution containing 0.025 gram of palladium per cc. The faujasite was then filtered, washed and dried at 300° F. Conversion of normal heptane under similar test conditions as in Table I was 35 wt. percent with this sample.

A 200 gram sample of synthetic faujasite is slurried in 600 ml. of deionized water. To this slurry is slowly added 500 ml. of a solution of $PdSO_4$ in dilute sulfuric acid containing 0.02 gram of palladium per cc. of solution. After the addition is complete, the solids are filtered, washed three times and dried at 300° F.

Test results show this sample is also superior in activity to that prepared by the conventional method.

While certain of the above specific examples have been concerned with the preparation of molecular sieves that have been converted to the hydrogen form, the invention is also applicable to other molecular sieves including those where the sodium cation that is regularly present is replaced by other cations. Thus, a large pore sodium sieve can be base exchanged with calcium chloride to convert it to the calcium form and the latter can be composited with the palladium compound and reduced to give a hydrocracking catalyst, the treating steps being conducted in accordance with the present invention. Other cracking catalysts can be prepared by base exchanging the sodium form of the molecular sieve with magnesium or calcium compounds, for example again employing the treating steps of the present invention to prepare catalysts of outstanding activity. The molecular sieve can also be subjected to multiple base exchange with different cationic solutions to thereby replace the sodium with more than one cation.

Also, while the specific examples have been directed to the treatment of synthetic molecular sieve zeolites, the invention is also applicable to naturally occurring zeolites having molecular sieve properties, such as faujasite or mordenite, and to modifications of such naturally occurring zeolites.

The scope of the invention is to be determined by the appended claims and not necessarily by the foregoing examples.

What is claimed is:

1. In a process for the preparation of hydrocarbon conversion catalysts comprising a crystalline-metallo-alumino-silicate molecular sieve zeolite having a silica to alumina mole ratio in the range between about 3 and about 10 and having pore openings in the range of 6 to 15 A. composited with a catalytically active form of palladium, the improvement comprising contacting said zeolite with a dilute, aqueous, acidic solution of a palladium compound as the means of introducing said palladium onto said zeolite.

2. The process of claim 1 wherein said palladium compound is a mineral acid salt of palladium chloride.

3. In the process of preparing a hydrocarbon conversion catalyst wherein a crystalline-metallo-alumino-silicate molecular sieve zeolite having a silica to alumina mole ratio in the range between about 3 and about 10 and having pore openings in the range of 6 to 15 A. is composited with a soluble palladium compound, the improvement comprising contacting said zeolite with an acidic aqueous solution of palladium chloride containing 0.0001 to 0.05 gram of palladium per cc. of solution as the means of introducing said palladium onto said zeolite.

4. The process of claim 3 wherein said zeolite is a synthetic faujasite in the hydrogen form and wherein said solution is maintained in contact with said sieve until a total of 0.1 to 5.0 wt. percent palladium is composited on said sieve.

5. An improved hydrocarbon conversion catalyst prepared by the process of contacting a crystalline-metallo-alumino-silicate molecular sieve zeolite having a silica to alumina mole ratio in the range between about 3 and about 10 and having pore openings in the range of 6 to 15 A. with a dilute, aqueous, acidic solution containing a soluble palladium compound so as to composite 0.1 to 5.0 wt. percent palladium on said zeolite.

6. The hydrocarbon conversion catalyst of claim 5 wherein said palladium compound is selected from the group consisting of palladium chloride and mineral acid salts thereof.

7. The catalyst composition of claim 5 wherein said zeolite is a synthetic faujasite which has been base exchanged so as to lower its sodium oxide content to less than 10 wt. percent.

8. The catalyst composition of claim 7 wherein said synthetic faujasite is in the hydrogen form.

References Cited

UNITED STATES PATENTS

| 2,914,461 | 11/1959 | Ciapetta | 208—111 |
| 2,971,904 | 2/1961 | Gladrow et al. | 208—135 |
| 3,140,253 | 7/1964 | Plank et al. | 208—120 |

ABRAHAM RIMENS, *Primary Examiner.*

DELBERT E. GANTZ, *Examiner.*